(12) United States Patent
Kawamura et al.

(10) Patent No.: US 9,528,890 B2
(45) Date of Patent: Dec. 27, 2016

(54) PRESSING FORCE SENSOR

(71) Applicant: MURATA MANUFACTURING CO., LTD., Nagaokakyo-Shi, Kyoto-fu (JP)

(72) Inventors: Hideki Kawamura, Nagaokakyo (JP); Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/603,483

(22) Filed: Jan. 23, 2015

(65) Prior Publication Data

US 2015/0135857 A1    May 21, 2015

Related U.S. Application Data

(63) Continuation of application No. PCT/JP2013/065297, filed on Jun. 1, 2013.

(30) Foreign Application Priority Data

Jul. 26, 2012  (JP) .................................. 2012-165736

(51) Int. Cl.
*G01L 1/22*    (2006.01)

(52) U.S. Cl.
CPC ........ *G01L 1/22* (2013.01); *G01L 1/225* (2013.01)

(58) Field of Classification Search
CPC .............. G01L 5/161; G01L 1/16; G01L 9/00; G01L 1/22; G01L 3/02
USPC .................................. 73/862.045, 777, 717
See application file for complete search history.

(56) References Cited

U.S. PATENT DOCUMENTS

| 4,188,258 A | * | 2/1980 | Mounteer et al. ............... 438/50 |
| 4,825,684 A | * | 5/1989 | Nishiguchi ............... G01L 9/06 73/1.59 |
| 4,996,627 A | * | 2/1991 | Zias ...................... G01L 9/0073 205/656 |

(Continued)

FOREIGN PATENT DOCUMENTS

| JP | S54-150987 A | 11/1979 |
| JP | 63-155676 | 6/1988 |

(Continued)

OTHER PUBLICATIONS

PCT/JP2013/065297 Written Opinion dated Jun. 17, 2013.

(Continued)

*Primary Examiner* — Lisa Caputo
*Assistant Examiner* — Octavia Hollington
(74) *Attorney, Agent, or Firm* — Arent Fox LLP (57) ABSTRACT

A pressing force sensor that includes an expandable and contractible film, pressing force detecting resistor membranes formed on a portion of a main surface of the film, and a support disposed along the main surface of the film. The support is provided with recesses or holes with openings located in areas where the pressing force detecting resistor membranes on the main surface of the film are located. In the pressing force sensor, when a pressing force is exerted on the main surface of the film, the film is expanded with a pressing force detecting resistor membrane. As a result, the pressing force detecting resistor membrane is deformed, and a change in resistance value of the pressing force detecting resistor membrane corresponding to the deformation is detected.

16 Claims, 5 Drawing Sheets

(56) References Cited

U.S. PATENT DOCUMENTS

| | | | |
|---|---|---|---|
| 8,174,372 B2* | 5/2012 | da Costa | G06F 3/016 340/407.1 |
| 8,539,839 B2* | 9/2013 | Suzuki | 73/717 |
| 2004/0012062 A1 | 1/2004 | Miyajima et al. | |
| 2009/0314410 A1 | 12/2009 | Kim et al. | |
| 2011/0115335 A1 | 5/2011 | Pelletier | |
| 2013/0152694 A1* | 6/2013 | Urvas | G01L 9/0073 73/724 |

FOREIGN PATENT DOCUMENTS

| | | |
|---|---|---|
| JP | 63-058121 | 3/1998 |
| JP | 2002-365151 A | 12/2002 |
| JP | 2004-053424 A | 2/2004 |
| JP | 3855410 B2 | 12/2006 |
| JP | 2009-210583 A | 9/2009 |
| JP | 2010-002407 A | 1/2010 |
| JP | 2010-152671 A | 7/2010 |
| JP | 2011-527059 A | 10/2011 |

OTHER PUBLICATIONS

PCT/JP2013/065297 ISR dated Jun. 17, 2013.
Japanese Office Action issued for corresponding application No. JP2014-526801, dated Jun. 23, 2015.

* cited by examiner

PRESSING FORCE SENSOR

CROSS REFERENCE TO RELATED APPLICATIONS

The present application is a continuation of International application No. PCT/JP2013/065297, filed Jun. 1, 2013, which claims priority to Japanese Patent Application No. 2012-165736, filed Jul. 26, 2012, the entire contents of each of which are incorporated herein by reference.

FIELD OF THE INVENTION

The present invention relates to pressing force sensors, and more particularly, to pressing force sensors configured using a resistor membrane.

BACKGROUND OF THE INVENTION

A pressing force sensor of interest to the present invention is described, for example, in JP 3855410 B1 (Patent Document 1). Patent Document 1 describes a strain gauge with a resistor formed by printing resistive paste such as carbon paste on an insulating substrate, for detecting a mechanical strain exerted on the resistor as a change in resistance value.

In the strain gauge described in Patent Document 1, as the insulating substrate, one having relatively high rigidity such as a phosphor-bronze plate with an insulated surface is used, and a unimorph structure in which the resistor is formed on the insulating substrate having the relatively high rigidity is adopted. The resistor is subjected to stress either in a compressive direction or in a tensile direction.

However, the strain gauge described in Patent Document 1 has problems as below.

Due to the unimorph structure, most of a pressing force is expended for deformation energy of the insulating substrate. Further, since the resistor is subjected to both compressive and tensile stresses, symmetrical changes in resistance are required with respect to stresses in both the directions.

Patent Document 1: JP 3855410 B1

SUMMARY OF THE INVENTION

Thus, an object of the present invention is to provide pressing force sensors that can solve the above-described problem.

The preset invention is characterized by having the following configuration to solve the above-described technical problem.

A pressing force sensor according to the present invention includes an expandable and contractible film, a pressing force detecting resistor membrane formed on a portion of a main surface of the film, and a support disposed along the main surface of the film. The support is provided with a recess or a hole with an opening located in an area where the pressing force detecting resistor membrane on the main surface of the film is located.

In this pressing force sensor, when a pressing force is exerted on the main surface of the film, the film is expanded with the pressing force detecting resistor membrane. As a result, the pressing force detecting resistor membrane is deformed, and a change in resistance value of the pressing force detecting resistor membrane corresponding to the deformation is detected.

Preferably, in a bridge circuit including a first resistance and a second resistance forming a first pair and a third resistance and a fourth resistance forming a second pair, the pressing force sensor according to the present invention detects a pressing force by detecting a change in resistance value of the first resistance and/or the second resistance. In this preferable embodiment, the first resistance and the second resistance are each provided by the above-described pressing force detecting resistor membrane.

More preferably, in the above-described preferable embodiment, the third resistance and the fourth resistance are each provided by a resistor membrane formed on the main surface of the film, different from the pressing force detecting resistor membrane. According to this embodiment, since all of the first to fourth resistances are provided by the resistor membranes formed on the main surface of the same film, the first to fourth resistances can be formed at the same time, and variations in resistance values of the first to fourth resistances can be reduced.

The pressing force sensor according to the present invention may further include a pressing operation member mounted on the film side to transmit a pressing operation by a finger of an operator to the main surface of the film. The pressing operation member reduces the conduction of heat of a finger of an operator to the pressing force detecting resistor membrane, thus being able to lower the possibility of occurrence of malfunctions.

The pressing force sensor according to the present invention may further include a piezoelectric film disposed along the film. The piezoelectric film has two kinds of use. First, a sensor using a resistor like the pressing force sensor according to the present invention consumes current when detecting a pressing force, thus increasing power consumption. Therefore, by making the sensor in a sleep state when it is not used, and detecting a wake-up operation with the piezoelectric film, power consumption can be reduced. Second, when polyvinylidene fluoride is used as the material of the piezoelectric film, pyroelectricity of polyvinylidene fluoride allows for detection of temperature changes as well. Therefore, processing to cancel out a change in resistance value due to a temperature change can be performed by software.

In the pressing force sensor according to the present invention, when a pressing force is exerted on the main surface of the film, the pressing force directly expands the film, and the expansion of the film causes the pressing force detecting resistor membrane to be effectively subjected to strain and deformed. Therefore, the pressing force sensor is low in cost, yet can achieve high sensitivity.

Further, since the film is subjected to stress only in a tensile direction, a resistive material having a difference between sensitivity in a compressive direction and sensitivity in a tensile direction can also be used as the material of the pressing force detecting resistor membrane without problems.

DETAILED DESCRIPTION OF THE INVENTION

First Embodiment

With reference to FIGS. 1 to 5, a pressing force sensor 1 according to a first embodiment will be described.

Figure 2:
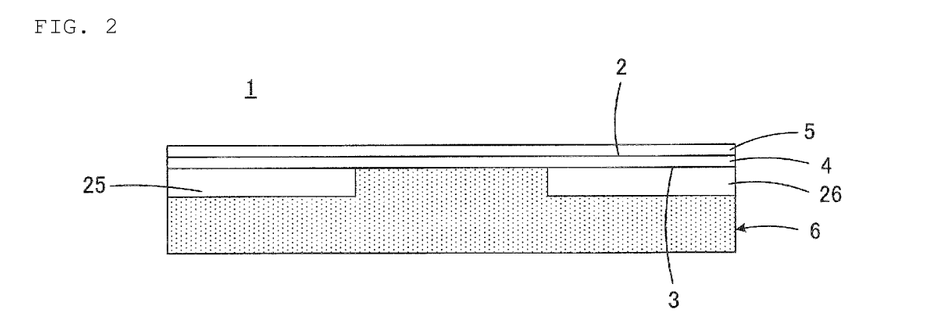
FIG. 2 is a cross-sectional view showing the pressing force sensor configured with the film shown in FIG. 1.

As shown in FIG. 2, the pressing force sensor 1 includes an expandable and contractible film 4 having a first main surface 2 and a second main surface 3 facing each other, a protective film 5 disposed along the first main surface 2 of the film 4, and a support 6 disposed along the second main surface 3 of the film 4. The film 4, the protective film 5, and the support 6 are preferably bonded to each other with an adhesive. When the adhesion of the film 4 is poor or the heat resistance of the film 4 is low, it is sometimes effective to use, as the adhesive, a thermoplastic adhesive.

The film 4 is formed, for example, from polyethylene terephthalate (PET), polyethylene naphthalate (PEN), polyimide, or the like. The protective film 5 is preferably formed from a resin material having a Young's modulus lower than that of the film 4. As the support 6, for example, a resin plate, a stainless steel plate, or a printed circuit board is used.

Figure 1:
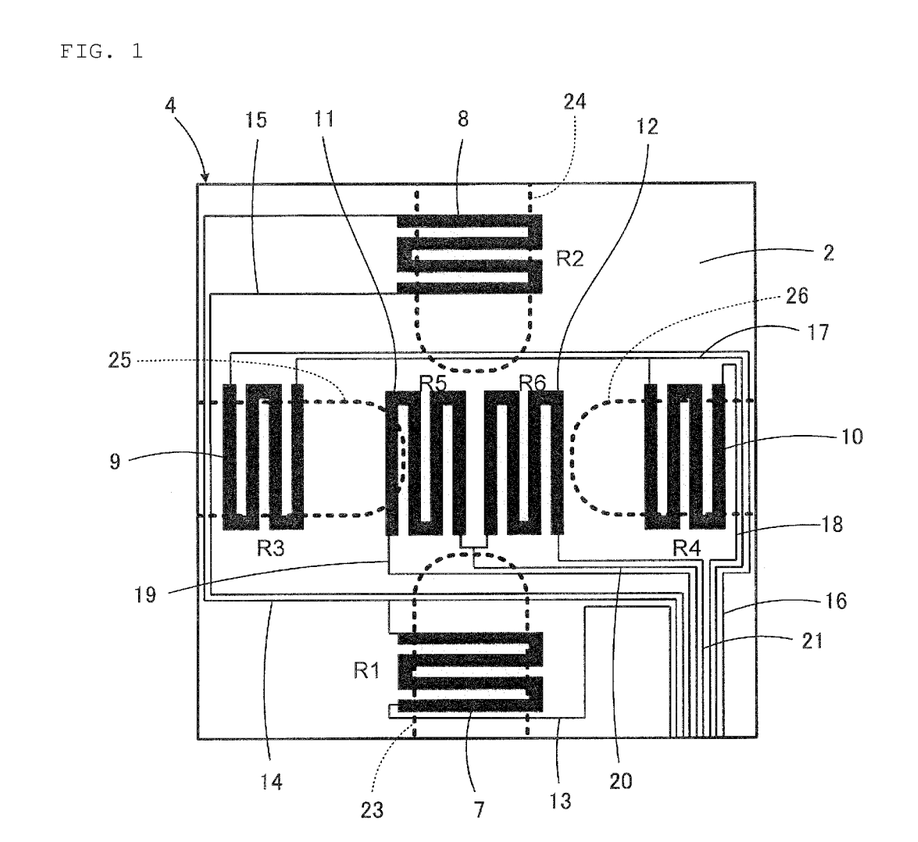
FIG. 1 is a plan view showing a film formed with resistor membranes provided in a pressing force sensor according to a first embodiment of the present invention.

As shown in FIG. 1, six resistor membranes 7 to 12 each in a meandering shape are formed on a portion of the first main surface 2 of the film 4. The resistor membranes 7 to 12 are formed by printing carbon paste, for example.

Figure 4:
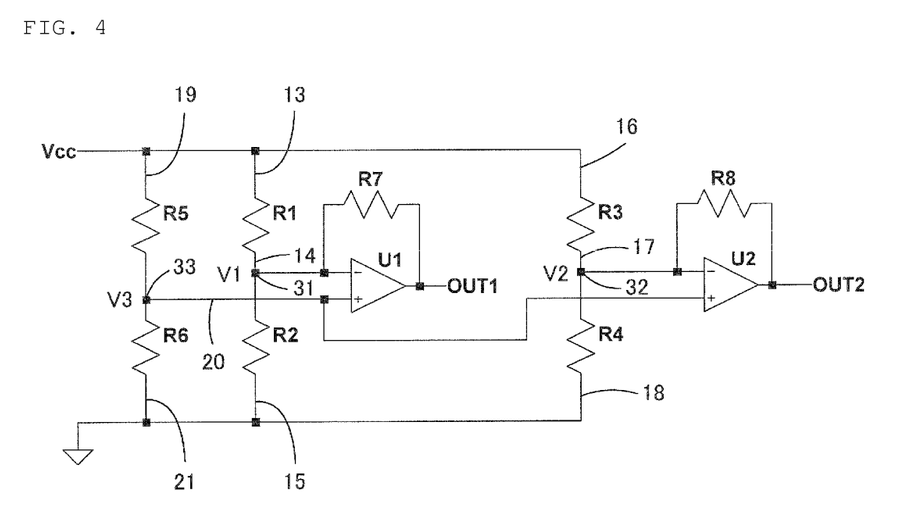
FIG. 4 is a diagram illustrating a circuit advantageously used for pressing force detection by the pressing force sensor shown in FIG. 1.

The six resistor membranes 7 to 12 provide resistances R1 to R6, respectively, for constituting a bridge circuit shown in FIG. 4. Conductor lines 13 to 21 necessary for constituting the bridge circuit shown in FIG. 4 are connected to the ends of the resistor membranes 7 to 12. Although each of the conductor lines 7 to 12 is represented by a single line in FIG. 1, in actuality, they have a predetermined dimension in the width direction. The conductor lines 7 to 12 are formed on the first main surface 2 of the film 4 by printing using silver paste, for example.

To clarify the correspondence relationships between the conductor lines shown in FIG. 1 and the conductor lines illustrated in the circuit diagram shown in FIG. 4, reference numerals "13" to "21" on the conductor lines shown in FIG. 1 are given to the corresponding conductor lines in FIG. 4.

The resistor membranes 7 to 12 and the conductor lines 13 to 21 may alternatively be formed on the second main surface 3 of the film 4 facing the support 6 side instead of the first main surface 2. In this case, the protective film 5 can be omitted.

The four resistor membranes 7 to 10 of the six resistor membranes 7 to 12 constitute pressing force detecting resistor membranes. In the support 6, four recesses 23 to 26 are provided as shown by broken lines in FIG. 1. The recesses 23 to 26 have openings located in areas where the pressing force detecting resistor membranes 7 to 10 are located, respectively. The recesses 23 to 26 may be replaced with holes penetrating through the support 6 in a thickness direction.

Figure 3:
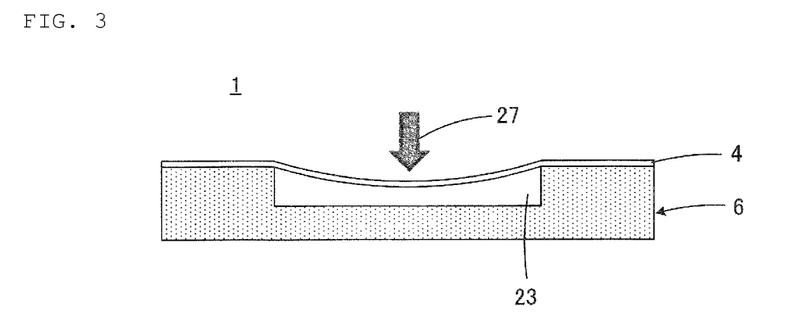
FIG. 3 is a cross-sectional view showing a portion of the pressing force sensor in order to illustrate a pressing operation on the film shown in FIG. 1.

As shown in FIG. 3, when a pressing force is applied to the pressing force sensor 1 with the above configuration in a direction shown by an arrow 27 toward an area in the film 4 where the opening of the recess 23, for example, is located, the film 4 is deformed to fall into the recess 23. With this, the film 4 is expanded inside the recess 23. The expansion of the film 4 causes the pressing force detecting resistor membrane 7 (see FIG. 1) located at the recess 23 to be subjected to strain and deformed. As a result, the resistance value of the pressing force detecting resistor membrane 7 increases. On the other hand, when the pressing force is removed, the film 4 returns to its original flat state.

The same can be said of the other pressing force detecting resistor membranes 8 to 10.

In FIG. 3, an illustration of the protective film 5 is omitted.

Next, an operation of the pressing force detection circuit shown in FIG. 4 will be described. In the circuit, the resistances R1 to R6 are provided by the resistor membranes 7 to 12 provided in the pressing force sensor 1, respectively, as described above. The other resistances R7 and R8 and operational amplifiers U1 and U2 are provided by an external circuit.

In the bridge circuit shown in FIG. 4, the resistances R1, R2, R5, and R6 constitute a first bridge, and the resistances R3, R4, R5, and R6 constitute a second bridge. In FIG. 4, voltages at connection points 31, 32, and 33 are represented by voltages V1, V2, and V3, respectively.

When no pressing force is exerted on any of the pressing force detecting resistor membranes 7 to 10 in the pressing force sensor 1, especially when no pressing force is exerted on any of the pressing force detecting resistor membranes 7 and 8, the first bridge is balanced (R5/R6=R1/R2), and as for the voltage V1 at the connection point 31 and the voltage V3 at the connection point 33, V1=V3. At this time, no current flows through the resistance R7, and an output OUT1 equals to a voltage between the resistance R5 and the resistance R6.

On the other hand, when no pressing force is exerted on any of the pressing force detecting resistor membranes 9 and 10, the second bridge is balanced (R5/R6=R3/R4), and as for the voltage V2 at the connection point 32 and the voltage V3 at the connection point 33, V2=V3. At this time, no current flows through the resistance R8, and an output OUT2 equals to a voltage between the resistance R5 and the resistance R6.

However, in practice, the resistance values of the resistances R1 to R6 vary, and thus the bridges are hardly completely balanced. Even under no pressing, a small amount of current flows through the resistance R7 and the resistance R8. Therefore, the design is made such that a voltage at the time of no pressing is recognized as a reference state (state of no pressing) by software.

In the first bridge, when a pressing force is exerted on the pressing force detecting resistor membrane 7 first, the resistance value of the corresponding resistance R1 is increased. This decreases the voltage V1 at the connection point 31, causing the first bridge to be out of balance. Thus, the operational amplifier U1 tries to maintain V1=V3. Specifically, it causes current to flow from the resistance R7 to the resistance R2. As a result, as the output OUT1, (V3+R7× current value) is detected.

On the other hand, when a pressing force is exerted on the pressing force detecting resistor membrane 8, the resistance value of the corresponding resistance R2 is increased. This increases the voltage V1 at the connection point 31, causing the first bridge to be out of balance. Thus, the operational amplifier U1 tries to maintain V1=V3. Specifically, it causes a portion of current flowing from the resistance R1 to the resistance R2 to flow to the resistance R7. As a result, as the output OUT1, (V3−R7×current value) is detected.

The same applies to the second bridge. In this case, the resistance R3 functions like the resistance R1, and the resistance R4 functions like the resistance R2.

In the second bridge, when a pressing force is exerted on the pressing force detecting resistor membrane 9 first, the resistance value of the corresponding resistance R3 is increased. This decreases the voltage V2 at the connection point 32, causing the second bridge to be out of balance. Thus, the operational amplifier U2 tries to maintain V2=V3. Specifically, it causes current to flow from the resistance R8 to the resistance R4. As a result, as the output OUT2, (V3+R8×current value) is detected.

On the other hand, when a pressing force is exerted on the pressing force detecting resistor membrane 10, the resistance value of the corresponding resistance R4 is increased. This increases the voltage V2 at the connection point 32, causing the second bridge to be out of balance. Thus, the operational amplifier U2 tries to maintain V2=V3. Specifically, it causes a portion of current flowing from the resistance R3 to the resistance R4 to flow to the resistance R8. As a result, as the output OUT2, (V3−R8×current value) is detected.

In the above manner, it is detected which of the pressing force detecting resistor membranes 7 to 10 in the pressing force sensor 1 is pressed, and how much the pressing force is.

The resistances R5 and R6 provided by the resistor membranes 11 and 12 are not subjected to pressing operation, and thus do not need to be provided inside the pressing force sensor 1, and may be provided by an external circuit.

However, when the resistances R5 and R6 are constituted by different components such as chip resistors, the possibility that individual variations in resistance value cause differences between the relative values of the resistance values (R1/R2, R3/R4, and R5/R6) becomes higher. The pressing force sensor 1 needs to detect a minute resistance change. Thus, the above-described variations between the relative values of the resistance values cause an offset voltage, decreasing a dynamic range of detection sensitivity. By contrast, when the resistances R5 and R6 are also provided by the resistor membranes 11 and 12 formed by printing simultaneously with the pressing force detecting resistor membranes 7 to 10 to constitute the resistances R1 to R4 as in this embodiment, the above-described variation problem can be reduced.

In the bridge circuit, the resistor membranes 7 and 8 in the meandering shape providing the resistances R1 and R2 forming a pair, respectively, are preferably oriented in the same direction with each other as shown in FIG. 1. Likewise, the resistor membranes 9 and 10 in the meandering shape providing the resistances R3 and R4 forming a pair, respectively, are preferably oriented in the same direction with each other, and the resistor membranes 11 and 12 in the meandering shape providing the resistances R5 and R6 forming a pair, respectively, are preferably oriented in the same direction with each other. For example, when resistor paste is printed using screen printing to form the resistor membranes 7 to 12, resistance values can vary depending on the travel direction of a squeegee. When the orientations of resistor membranes forming a pair are aligned with each other, the relative difference in resistance value between the resistor membranes forming the pair can be reduced.

The resistance value of each of the resistances R1 to R6 forming the bridges is in a range of 10 kΩ to 10 MΩ, and preferably about 100 kΩ to 1Ω. A low resistance value causes much current to flow, increasing power consumption. On the other hand, a high resistance value causes susceptibility to noise.

Figure 5:
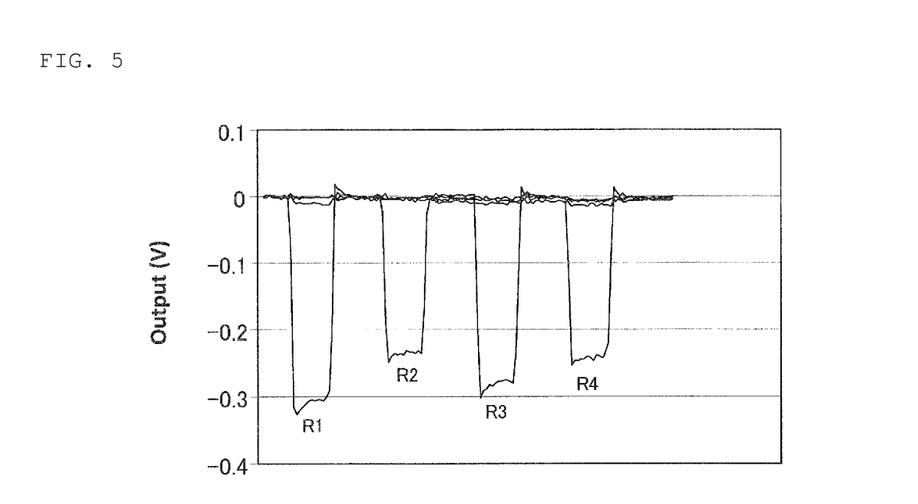
FIG. 5 is a graph showing output voltages obtained when pressing operation is performed on each of resistances provided by pressing force detecting resistor membranes in the pressing force sensor shown in FIG. 1.

FIG. 5 shows measurement results on output voltages obtained when a pressing force of about 400 gf is applied to each of the pressing force detecting resistor membrane 7 providing the resistance R1, the pressing force detecting resistor membrane 8 providing the resistance R2, the pressing force detecting resistor membrane 9 providing the resistance R3, and the pressing force detecting resistor membrane 10 providing the resistance R4, sequentially, at portions where the recesses 23 to 26 of the support 6 are located in the pressing force sensor 1 designed so that the resistance value of each of the resistances R1 to R6 becomes about 700 kΩ. The measurement results shown in FIG. 5 are obtained by independently detecting a resistance change of each of the resistances R1 to R4, unlike in a circuit shown in FIG. 4.

Second Embodiment

Figure 6:
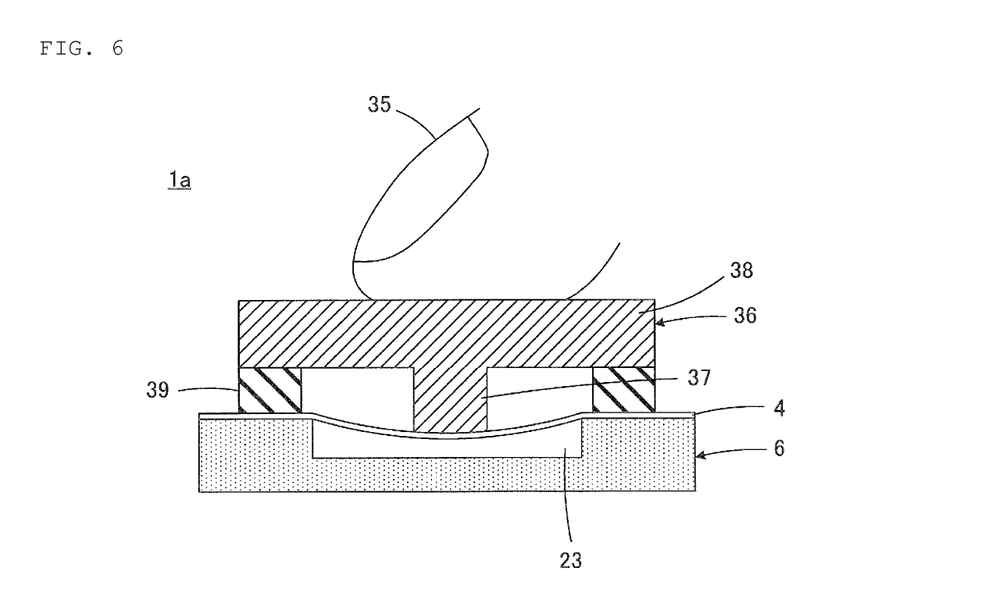
FIG. 6 is a cross-sectional view showing a portion of a pressing force sensor according to a second embodiment of the present invention.

With reference to FIG. 6, a pressing force sensor 1a according to a second embodiment will be described. FIG. 6 is a diagram corresponding to FIG. 3 in the first embodiment. In FIG. 6, elements corresponding to those shown in FIG. 3 are denoted by the same reference numerals, and will not be redundantly described.

The pressing force sensor 1a shown in FIG. 6 is characterized in that a pressing operation member 36 is mounted on the side of a film 4 to transmit a pressing operation by a finger 35 of an operator to a main surface of the film 4. The pressing operation member 36 has a shape including a shaft 37 and a flange 38. The shaft 37 serves as an acting portion on the film 4, and the flange 38 provides a surface to receive a pressing operation by the finger 35. An elastic body 39 is preferably disposed between the pressing operation member 36 and the film 4 to stabilize the position of the pressing operation member 36.

When the finger 35 of the operator presses the pressing operation member 36 toward an area in the film 4 where an opening of a recess 23 is located, for example, the film 4 is deformed to fall into the recess 23. With this, the film 4 is expanded in the recess 23. On the other hand, when the pressing force is removed, the film 4 returns to its original flat state.

According to this embodiment, the conduction of heat of the finger 35 to the film 4 is reduced. Therefore, a problem of false detection caused by a change in resistance value due to a temperature change can be advantageously avoided. Thus, more precise detection becomes possible.

Third Embodiment

Figure 7:
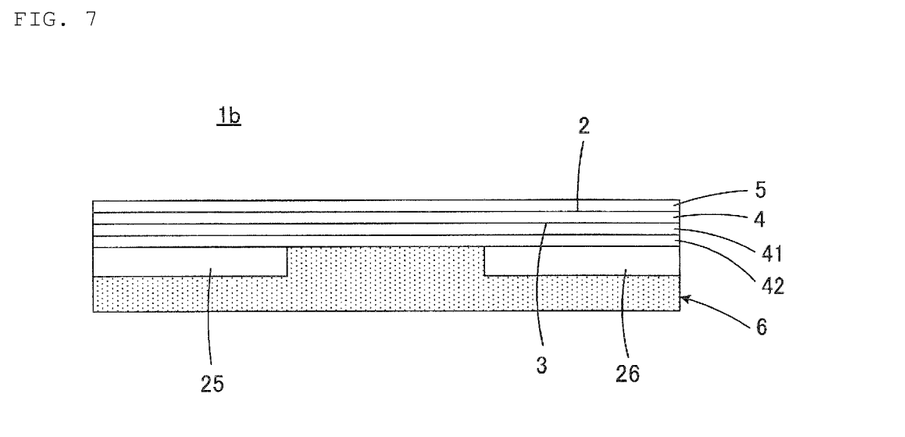
FIG. 7 is a cross-sectional view showing a pressing force sensor according to a third embodiment of the present invention.
Figure 8A:
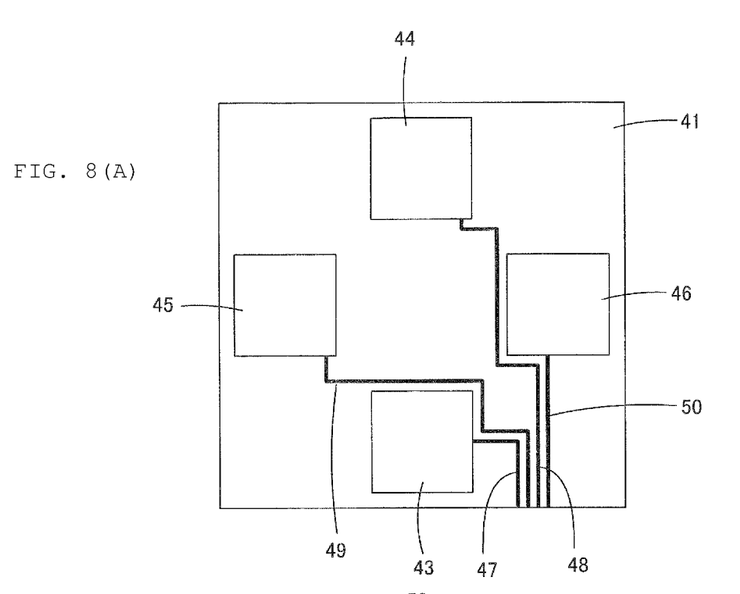
FIG. 8A is a plan view showing a piezoelectric film used in the pressing force sensor shown in FIG. 7.
Figure 8B:
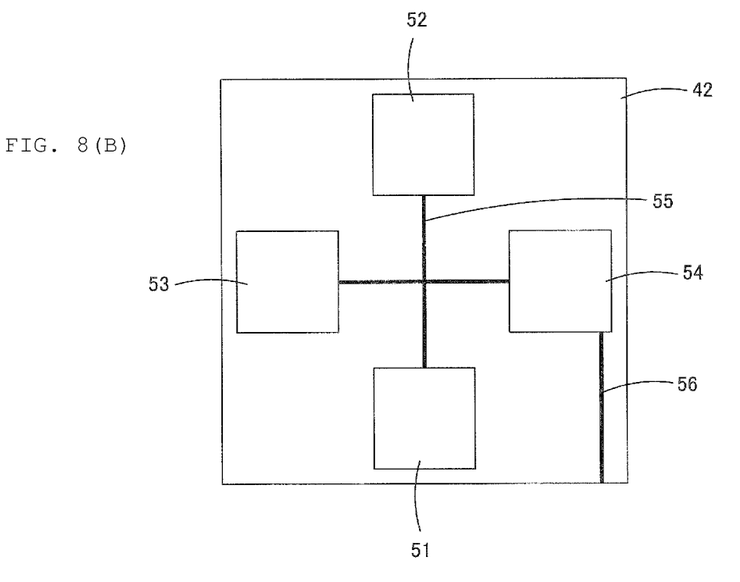
FIG. 8B is a plan view showing a resin film placed on the piezoelectric film for use.

With reference to FIG. 7, FIG. 8A, and FIG. 8B, a pressing force sensor 1b according to a third embodiment will be described. FIG. 7 is a diagram corresponding to FIG. 2 in the first embodiment. In FIG. 7, elements corresponding to those shown in FIG. 2 are denoted by the same reference numerals, and will not be redundantly described.

As is seen by comparison between FIG. 7 and FIG. 2, the pressing force sensor 1b shown in FIG. 7 is characterized by further including a piezoelectric film 41 and a resin film 42 disposed along a film 4. FIG. 8A shows an electrode pattern formed on the piezoelectric film 41, and FIG. 8B shows an electrode pattern formed on the resin film 42.

The piezoelectric film 41 is formed, for example, from a polymer having piezoelectricity such as polylactic acid or polyvinylidene fluoride. On one main surface of the piezoelectric film 41, electrodes 43 to 46 are formed in positions corresponding to the positions of pressing force detecting resistor membranes 7 and 8 formed on the above-described film 4. Further, lead lines 47 to 50 led from the electrodes 43 to 46, respectively, are formed on the one main surface of the piezoelectric film 41.

The resin film 42 is formed, for example, from a polymer having electrical insulation such as polyethylene terephthalate. On one main surface of the resin film 42, electrodes 51 to 54 are formed in positions opposite to the above-described electrodes 43 to 46, respectively. On the one main surface of the resin film 42, the electrodes 51 to 54 are connected to each other by connection lines 55, and led by a lead line 56. The electrodes 51 to 54 may be replaced with an electrode into which these are combined.

In this embodiment, the piezoelectric film 41 has two kinds of use.

A first use is as below. A sensor using a resistor like the pressing force sensor according to the present invention consumes current when detecting a pressing force, thus increasing power consumption. Therefore, by making the pressing force sensor in a sleep state when it is not used, and detecting a wake-up operation with the piezoelectric film 41, power consumption can be reduced. Specifically, when a pressing operation is performed on any of the pressing force detecting resistor membranes 7 to 10, the pressing operation is transmitted to the piezoelectric film 41, thereby deforming the piezoelectric film 41 as well. The deformation of the piezoelectric film 41 generates charges due to the piezoelectric effect. The charges are taken by any of the electrodes 43 to 46 and any of the electrodes 51 to 54. A signal obtained by the charges taken like this can be used as a signal to start a wake-up operation.

For the first use, as the material of the piezoelectric film 41, polylactic acid is preferably used in terms of generating piezoelectricity only by stretching and eliminating the need to perform poling treatment. Further, polylactic acid has no pyroelectricity, and thus is excellent in terms of being unaffected by temperature. Polylactic acid has L-type polylactic acid (PLLA) and D-type polylactic acid (PDLA). Using PLLA is preferable in terms of easy availability.

A second use is as below. When polyvinylidene fluoride is used as the material of the piezoelectric film 41, pyroelectricity of polyvinylidene fluoride allows for detection of temperature change as well. Therefore, processing to cancel out a change in resistance value due to a temperature change caused by conduction of heat from a finger as in the case of not using the pressing operation member 36 used in the above-described second embodiment can be performed by software.

By forming the electrodes 43 to 46 on one main surface of the piezoelectric film 41 and forming the electrodes 51 to 54 on the other main surface in the third embodiment, the resin film 42 can be omitted.

DESCRIPTION OF REFERENCE SYMBOLS 1, 1*a*, 1*b* pressing force sensor
2, 3 main surface
4 film
6 support
7 to 10 pressing force detecting resistor membrane
11, 12 resistor membrane
13 conductor line
23 to 26 recess
36 pressing operation member
41 piezoelectric film

The invention claimed is:

1. A pressing force sensor comprising:
an expandable and contractible film;
a pressing force detecting resistor membrane on a portion of a first surface of the expandable and contractible film; and
a support adjacent the expandable and contractible film, the support having a recess adjacent the portion of the expandable and contractible film where the pressing force detecting resistor membrane is located, wherein
the pressing force detecting resistor membrane includes a pair of opposing parts and a connecting part that connects the pair of opposing parts, the connecting part being located outside of the recess, and
the expandable and contractible film is configured to be deformed and expanded into the recess when a pressing force is exerted on the first surface of the expandable and contractible film toward the recess such that a change in resistance value of the pressing force detecting resistor membrane caused by the pressing force is detected.

2. The pressing force sensor according to claim 1, wherein the pressing force detecting resistor membrane includes a first resistor membrane and a second resistor membrane forming a part of a first bridge circuit, and the pressing force is detected by detecting a change in resistance value of the first resistor membrane or the second resistor membrane, or both the first resistor membrane and the second resistor membrane.

3. The pressing force sensor according to claim 2, wherein the pressing force detecting resistor membrane further includes a third resistor membrane and a fourth resistor membrane forming a part of a second bridge circuit, and the pressing force is detected by detecting a change in resistance value of the third resistor membrane or the fourth resistor membrane, or both the third resistor membrane and the fourth resistor membrane.

4. The pressing force sensor according to claim 3, wherein the first resistor membrane and the second resistor membrane each have a first meandering shape.

5. The pressing force sensor according to claim 4, wherein the third resistor membrane and the fourth resistor membrane each have a second meandering shape.

6. The pressing force sensor according to claim 5, wherein the first meandering shape of the first resistor membrane and the second resistor membrane are oriented in a same direction, and wherein the second meandering shape of the third resistor membrane and the fourth resistor membrane are oriented in a same direction.

7. The pressing force sensor according to claim 2, wherein the first resistor membrane and the second resistor membrane each have a meandering shape.

8. The pressing force sensor according to claim 7, wherein the meandering shape of the first resistor membrane and the second resistor membrane are oriented in a same direction.

9. The pressing force sensor according to claim 1, further comprising a protective film on the first surface of the expandable and contractible film, and wherein the support is adjacent a second surface of the expandable and contractible film, the second surface being opposite the first surface.

10. The pressing force sensor according to claim 1, wherein the support is adjacent the first surface of the expandable and contractible film.

11. The pressing force sensor according to claim 1, further comprising a pressing operation member adjacent the expandable and contractible film and opposite to the support, the pressing operation member configured to transmit a pressing operation to the first surface of the expandable and contractible film.

12. The pressing force sensor according to claim 1, further comprising a piezoelectric film adjacent the expandable and contractible film.

13. The pressing force sensor according to claim 12, wherein the piezoelectric film is between the expandable and contractible film and the support.

14. The pressing force sensor according to claim 12, further comprising a resin film adjacent the piezoelectric film.

15. The pressing force sensor according to claim 14, further comprising:
   a first electrode on the piezoelectric film, the first electrode being opposed to the pressing force detecting resistor membrane; and
   a second electrode on the resin film, the second electrode being opposed to the first electrode.

16. The pressing force sensor according to claim 12, further comprising an electrode on the piezoelectric film, the electrode being opposed to the pressing force detecting resistor membrane.

* * * * *